US011000999B2

(12) United States Patent
Braunroth

(10) Patent No.: US 11,000,999 B2
(45) Date of Patent: May 11, 2021

(54) BUILD MATERIAL APPLICATION DEVICE

(71) Applicant: CONCEPT LASER GMBH, Lichtenfels (DE)

(72) Inventor: Domenik Braunroth, Neustadt bei Coburg (DE)

(73) Assignee: CONCEPT LASER GMBH, Lichtenfels (DE)

(*) Notice: Subject to any disclaimer, the term of this patent is extended or adjusted under 35 U.S.C. 154(b) by 207 days.

(21) Appl. No.: 16/140,280

(22) Filed: Sep. 24, 2018

(65) Prior Publication Data
US 2019/0118466 A1 Apr. 25, 2019

(30) Foreign Application Priority Data
Oct. 20, 2017 (EP) ..................................... 17197636

(51) Int. Cl.
*B29C 64/214* (2017.01)
*B29C 64/236* (2017.01)
(Continued)

(52) U.S. Cl.
CPC .......... *B29C 64/214* (2017.08); *B22F 3/1055* (2013.01); *B29C 64/135* (2017.08);
(Continued)

(58) Field of Classification Search
None
See application file for complete search history.

(56) References Cited

U.S. PATENT DOCUMENTS 10,093,065 B2 * 10/2018 Ederer .................. B29C 64/165
2006/0108712 A1 * 5/2006 Mattes .................... B22F 3/004
264/308
(Continued)

FOREIGN PATENT DOCUMENTS

CN 104493165 A 4/2015
CN 104741609 * 7/2015
(Continued)

OTHER PUBLICATIONS

European Search Opinion Corresponding to Application No. 17197636.8.
(Continued)

*Primary Examiner* — Mary Lynn F Theisen
(74) *Attorney, Agent, or Firm* — Dority & Manning, P.A.

(57) ABSTRACT

Build material application device (6) for an apparatus (1) for additively manufacturing three-dimensional objects (2), the build material application device (6) being adapted to apply an amount of build material (3) in a build plane (BP) of a respective apparatus (1), the build material application device (6) comprising: a first build material application element (6a), the first build material application element (6a) being moveably supported in a first motion path (MP1) in which the first build material application element (6a) is moved across the build plane (BP), and in a second motion path (MP2) in which the first build material application element (6a) is not moved across the build plane (BP); a second build material application element (6b), the second build material application element (6b) being moveably supported in a first motion path (MP1) and in a second motion path (MP2).

15 Claims, 9 Drawing Sheets

(51) Int. Cl.
  *B33Y 30/00* (2015.01)
  *B29C 64/153* (2017.01)
  *B29C 64/30* (2017.01)
  *B29C 64/232* (2017.01)
  *B33Y 10/00* (2015.01)
  *B22F 3/105* (2006.01)
  *B29C 64/135* (2017.01)
  *B29C 64/245* (2017.01)

(52) U.S. Cl.
  CPC .......... *B29C 64/153* (2017.08); *B29C 64/232* (2017.08); *B29C 64/236* (2017.08); *B29C 64/245* (2017.08); *B29C 64/30* (2017.08); *B33Y 30/00* (2014.12); *B22F 2003/1056* (2013.01); *B33Y 10/00* (2014.12)

(56) References Cited

U.S. PATENT DOCUMENTS

| | | |
|---|---|---|
| 2006/0165546 A1 | 7/2006 | Yamada et al. |
| 2014/0306379 A1 | 10/2014 | Hartmann et al. |
| 2018/0079137 A1 | 3/2018 | Herzog et al. |
| 2019/0168304 A1* | 6/2019 | Krol ........................ B29C 64/20 |

FOREIGN PATENT DOCUMENTS

| | | |
|---|---|---|
| CN | 107206680 A | 9/2017 |
| JP | 2006/200030 A | 8/2006 |
| JP | 2012/246541 A | 12/2012 |
| WO | 2013029594 A1 | 3/2013 |
| WO | 2016177516 A1 | 11/2016 |

OTHER PUBLICATIONS

European Search Report Corresponding to Application No. 17197636 dated Apr. 18, 2018. Japanese Office Action Corresponding to Application No. 2018120622 dated Jul 5, 2019.

Japanese Office Action Corresponding to Application No. 2018120622 dated Jul 5, 2019.

Chinese Search Report and Office Action Corresponding to Application No. 201810047964 dated Jul. 14, 2020.

* cited by examiner

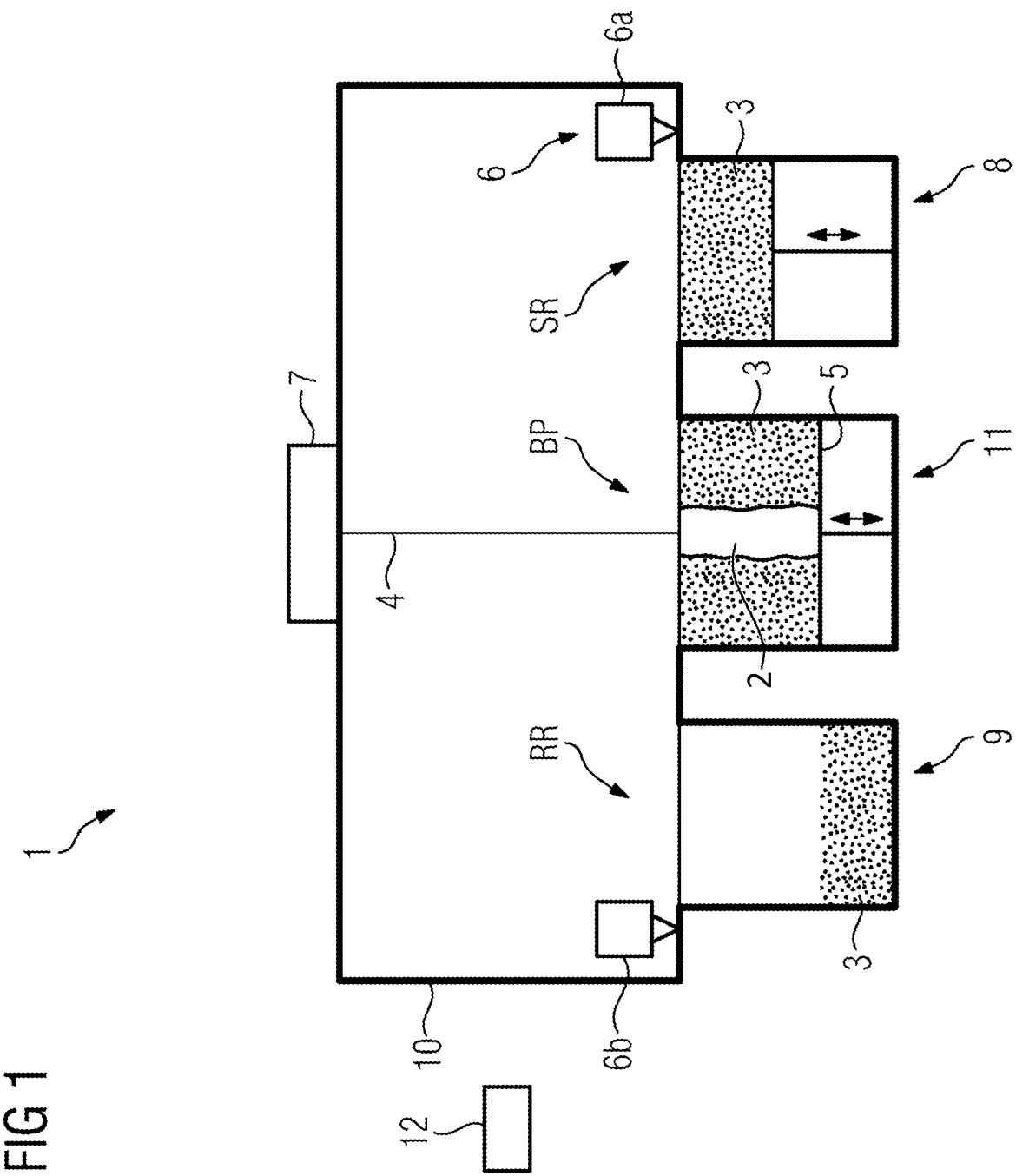

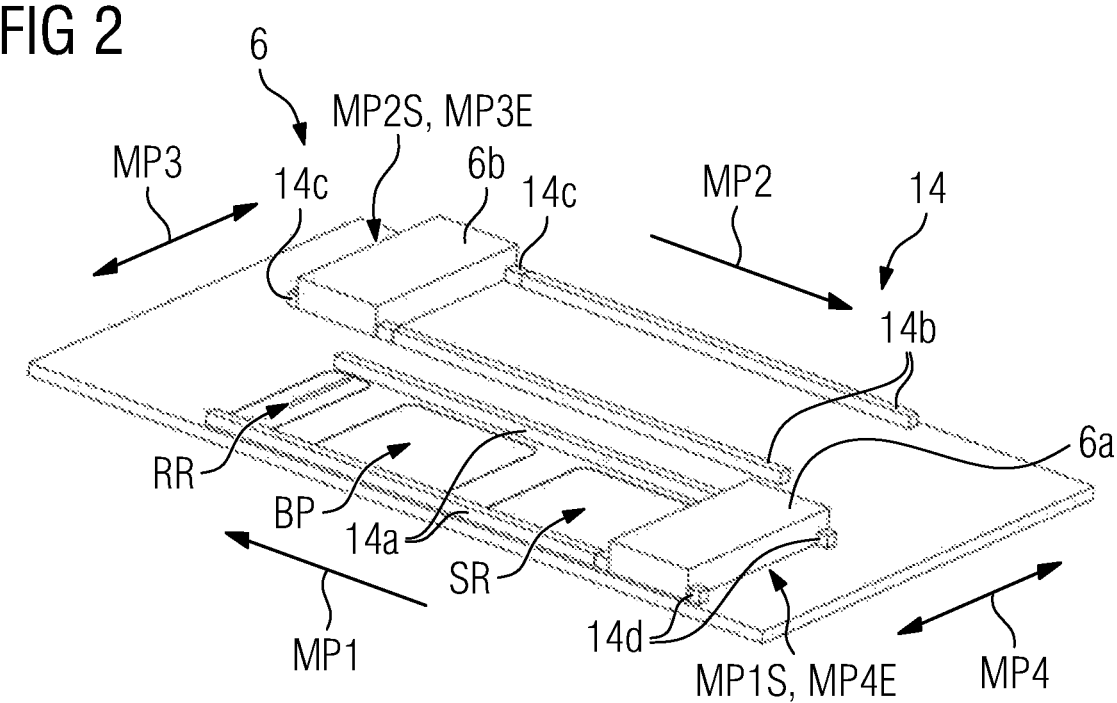
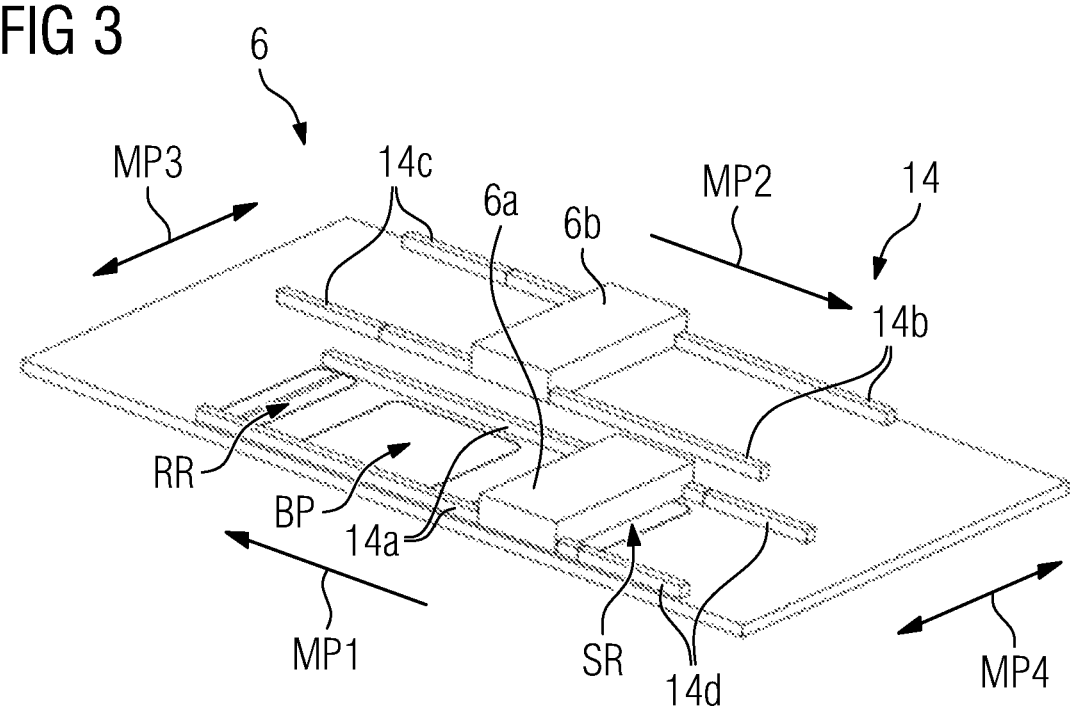

BUILD MATERIAL APPLICATION DEVICE

CROSS-REFERENCE TO RELATED APPLICATIONS

This application claims priority to European Patent Application serial no. 17 197 636.8 filed Oct. 20, 2017, the contents of which is incorporated herein by reference in its entirety as if set forth verbatim.

BACKGROUND

The invention relates to a build material application device for an apparatus for additively manufacturing three-dimensional objects by means of successive layerwise selective irradiation and consolidation of layers of build material which can be consolidated by means of an energy beam, the build material application device being adapted to apply an amount of build material in a build plane of a respective apparatus.

Respective build material devices being adapted to apply an amount of build material in a build plane of an apparatus for additively manufacturing three-dimensional objects, e.g. selective laser melting apparatuses or selective electron beam melting apparatuses, are generally known.

Since the efficiency of the build material application process is of great significance for the efficiency of the entire additive manufacturing process, different build material application strategies have been suggested.

One known build material application strategy is to repeatedly move a single build material application element, i.e. a re-coating element, across the build plane of a respective apparatus between a first and a second position; the build material application element moves from the first position across the build plane towards the second position in a specific track of motion, whereby an amount of build material is applied so as to form a first build material layer, and moves back from the second position across the build plane towards the first position in the same track of motion, whereby an amount of build material is applied so as to form a further build material layer.

BRIEF SUMMARY

Yet, there is a need for further improved build material application strategies allowing for an efficient application of build material in a build plane of a respective apparatus for additively manufacturing three-dimensional objects.

It is the object of the invention to provide a build material application device allowing for an efficient application of build material in a build plane of an apparatus for additively manufacturing three-dimensional objects.

This object is achieved by a build material application device according to claim 1. The claims depending on claim 1 relate to possible embodiments of the build material application device according to claim 1.

The build material application device described herein is adapted to apply an amount, particularly a specific amount, of build material in a build plane of an apparatus for additively manufacturing three-dimensional objects ("apparatus"), e.g. technical components, by means of successive layerwise selective irradiation and consolidation of layers of build material which can be consolidated by means of an energy beam. Thus, the build material application device is typically allocated to a respective apparatus. By applying an amount of build material—which can be a powder, particularly a metal powder—in a build plane of a respective apparatus, a build material layer is formed, which build material layer is to be selectively irradiated and consolidated during operation of the apparatus. Thus, the build material application device is adapted to apply an amount of build material in a build plane of an apparatus so as to form a build material layer which is to be selectively irradiated and consolidated during operation of the apparatus. This build material application process is repeated several times during operation of the apparatus.

The build material application device comprises at least two separate build material application elements. Each build material application element may be built as or comprise a re-coating element, e.g. a re-coating blade. Hence, the build material application device may be built as a re-coating device, comprising at least a first build material application element being built as a re-coating element, particularly a re-coating blade, or comprising a re-coating element, particularly a re-coating blade, and a second build material application element being built as a re-coating element, particularly a re-coating blade, or comprising a re-coating element, particularly a re-coating blade. Yet, other embodiments of the build material application device and respective build material application elements are conceivable; as such, a build material application element may be built as or comprise a build material containment having at least one, particularly gate-like, opening through which build material may exit the containment so as to apply an amount, particularly a specific amount, of build material in a build plane of a respective apparatus; the at least one opening being controllably closable by at least closing element.

The first build material application element is moveably supported in a first motion path in which the first build material application element is moved across the build plane of the apparatus, the build material application device is allocated to, and in a second motion path in which the first build material application element is not moved across the build plane of the apparatus, the build material application device is allocated to. Hence, when moving the first build material application element in the first motion path, the first build material application element is moved across the build plane so that it is possible to apply an amount of build material in the build plane and possible to form a build material layer which is to be selectively irradiated and consolidated during operation of the apparatus. The first motion path may be deemed or denoted as a build material application path in which build material is applied in the build plane of the apparatus.

When moving the first build material application element in the second motion path, the first build material application element is not moved across the build plane of the apparatus, the build material application device is allocated to, so that it is not possible to apply an amount of build material in the build plane of the apparatus, the build material application device is allocated to, and not possible to form a build material layer which is to be selectively irradiated and consolidated during operation of the apparatus. The second motion path may be deemed or denoted as a return path in which no build material is applied in the build plane of the apparatus. The direction of motion of the first build material application element in the first motion path may be different, e.g. opposite, to the direction of motion of the first build material application element in the second motion path.

Likewise, the second build material application element is moveably supported in a first motion path in which the second build material application element is moved across the build plane of the apparatus, the build material application device is allocated to, and in a second motion path in which the second build material application element is not moved across the build plane of the apparatus, the build material application device is allocated to. Hence, when moving the second build material application element in the first motion path, the second build material application element is moved across the build plane so that it is possible to apply an amount of build material in the build plane and possible to form a build material layer which is to be selectively irradiated and consolidated during operation of the apparatus. The first motion path may be deemed or denoted as a build material application path in which build material is applied in the build plane of the apparatus.

When moving the second build material application element in the second motion path, the second build material application element is not moved across the build plane of the apparatus, the build material application device is allocated to, so that it is not possible to apply an amount of build material in the build plane of the apparatus, the build material application device is allocated to, and not possible to form a build material layer which is to be selectively irradiated and consolidated during operation of the apparatus. The second motion path may be deemed or denoted as a return path in which no build material is applied in the build plane of the apparatus. The direction of motion of the second build material application element in the first motion path may be different, e.g. opposite, to the direction of motion of the second build material application element in the second motion path.

By providing at least two respective build material application elements each being moveably supported in a respective first and second motion path, a highly efficient application of build material in a build plane of an apparatus is feasible. Thus, the build material application device allows for an efficient application of build material in a build plane of an apparatus.

A respective first motion path can be defined by a first translational axis of motion, particularly by a first linear axis of motion. The first translational axis of motion can be horizontally oriented. Thus, the first motion path can be or comprise a first translational axis of motion which is horizontally oriented. A respective second motion path can be defined by a second translational axis of motion, particularly by a second linear axis of motion. The second translational axis of motion can be horizontally oriented. Thus, the second motion path can be or comprise a second translational axis of motion which is horizontally oriented.

The build material application elements are moveable in the respective motion paths by means of at least one drive unit, e.g. a linear drive unit, in particular a linear motor, adapted to generate a drive force which acts on the build material application elements so as to move the build material application elements in the respective motion paths. At least one motion and/or position determination device, e.g. a motion and/or position encoder, can be associated with the build material application elements so as to qualitatively and/or quantitatively determine a (current) motion and/or position of the build material application elements.

The build material application elements may be moved independently or dependently of each other in the respective motion paths. Hence, the build material application elements may be moved with the same or different motion parameters, e.g. (positive or negative) acceleration, speed, etc.

As will be explained below in more detail, the build material application device may comprise a hard- and/or software embodied control unit which is adapted to control motions of the build material application elements. The control unit may communicate with respective drive units adapted to generate a respective drive force which acts on the build material application elements so as to move the build material application elements in the respective motion paths.

The first motion path of the first build material application element may be the same as the first motion path of the second build material application element. Alternatively, the first motion path of the first build material application element may be different from the first motion path of the second build material application element, given that an application of build material in the build plane of the apparatus, the build material application device is allocated to, is possible while moving the respective build material application element in the respective first motion path.

Likewise, the second motion path of the first build material application element may be the same as the second motion path of the second build material application element. Alternatively, the second motion path of the first build material application element may be different from the second motion path of the second build material application element, given that an application of build material in the build plane of the apparatus, the build material application device is allocated to, is not possible while moving the respective build material application element in the respective second motion path.

The respective motion paths the build material application elements are movably supported in, i.e. along which the build material application elements can be moved, are typically defined by a motion path-related start position and a motion path-related end position. As such, a respective first motion path may extend between a motion path-related start position of the first motion path and a motion path-related end position of the first motion path and a respective second motion path may extend between a motion path-related start position of the second motion path and a motion path-related end position of the second motion path. It is possible that an end position of a first or second motion path may coincide with a start position of a second or first motion path or that an end position of a second or first motion path may coincide with a start position of a first or second motion path, respectively.

The start position of a respective first motion path may be (laterally) offset from a first side of the build plane of the apparatus, the build material application device is allocated to, whereby the first motion path still comprises the build plane of the respective apparatus. In other words, the start position of a respective first motion path may be laterally adjacently located to a first (lateral) side of the build plane of the apparatus, the build material application device is allocated to. The start position of a respective first motion path may particularly, be in or (laterally) in front of a build material supplying region from which an amount of build material, which is to be applied in the build plane of the apparatus during motion of the respective build material application element in the first motion path, is supplyable or supplied. A respective build material supplying region may be provided by a dose device, particularly by a dose module, which is adapted to dose an amount, particularly a specific amount, of build material which is to be applied in the build plane of the apparatus during motion of the respective build material application element in the first motion path.

The end position of a respective first motion path may be (laterally) offset from a second side of the build plane of the apparatus, the build material application device is allocated to, whereby the first motion path still comprises the build plane of the respective apparatus. The second side of the build plane of the apparatus may be opposite the first side of the build plane of the apparatus. In other words, the end position of a respective first motion path may be laterally adjacently located to a second (lateral) side of the build plane of the apparatus, the build material application device is allocated to. The end position of a respective first motion path may particularly, be in or (laterally) behind a build material receiving region in which an amount of build material which was not applied in the build plane of the apparatus during motion of the respective build material application element in the first motion path, is receivable or received. A respective build material receiving region may be provided by an overflow device, particularly by an overflow module, which is adapted to receive an amount of build material which was not applied in the build plane of the apparatus during motion of the respective build material application element in the first motion path.

As is apparent from the above, the first or second build material application element may be moved at least partly across a respective build material supplying region, the build plane, and at least partly across a respective build material receiving region during motion in the first motion path. Particularly, the first or second build material application element may be moved across a respective build material supplying region, the build plane, and a respective build material receiving region during motion in the first motion path. Hence, a respective first motion path may comprise a motion across a respective build material supplying region, the build plane, and a respective build material receiving region. Thus, the start and end position of a respective first motion path are typically arranged in the plane which comprises the build plane of the apparatus the build material application device is allocated to and also a respective build material supplying region and/or build material receiving region. Hence, the first motion path may be expressed by a line extending across the build plane, preferably across a respective build material supplying region, the build plane and a respective build material receiving region.

The start position of a respective second motion path may be (laterally) offset from a first side of the build plane of the apparatus, the build material application device is allocated to, whereby the second motion path does not comprise the build plane of the apparatus, the build material application device is allocated to. The end position of a respective second motion path may be (laterally) offset from a second side of the build plane of the apparatus, the build material application device is allocated to, whereby the second motion path does not comprise the build plane of the respective apparatus. The second side of the build plane of the apparatus may be opposite the first side of the build plane of the apparatus. Thus, the start and end position of a respective second motion path may also be arranged in a plane which does not comprise the build plane of the apparatus the build material application device is allocated to. Hence, the second motion path may be expressed by a line not extending across the build plane, preferably not across a respective build material supplying region, the build plane and a respective build material receiving region.

As is apparent from the above, the first motion path of the first and second build material application element and the second motion path of the first and second build material application element may extend in the same horizontal plane. Thereby, the first motion path of the first and second build material application element and the second motion path of the first and second build material application element may be horizontally offset from each other while being arranged in the same horizontal plane. In particularly, the first motion path of the first and second build material application element and the second motion path of the first and second build material application element may at least partially extend in parallel given that the first motion path extends across the build plane and the second motion path does not extend across the build plane.

As is also apparent from the above, the first motion path of the first and second build material application element and the second motion path of the first and second build material application element may extend in different horizontal planes. In other words, the first motion path of the first and second build material application element and the second motion path of the first and second build material application element may be vertically offset from each other since they are arranged in different horizontal planes, the planes being vertically offset from each other. In particularly, the first motion path of the first and second build material application element and the second motion path of the first and second build material application element may extend on top of each other resulting in vertically stacked arrangement of the first and second motion path.

The first build material application element and the second build material application element may be also moveably supported in a third motion path in which the first or second build material application element is moved from a position in the first motion path, particularly an end position of the first motion path, to a position in the second motion path, particularly a start position of the second motion path. The third motion path can thus, serve for translating the respective build material application element from the first motion path to the second motion path, particularly from an end position of the first motion path to a start position of the second motion path. The third motion path can be deemed or denoted as a translation path for translating a respective build material application element from the first motion path to the second motion path. The third motion path can be defined by a third translation axis of motion, particularly a third linear axis of motion.

The first build material application element and/or the second build material application may be also moveably supported in a fourth motion path in which the first and second build material application element is moved from a position in the second motion path, particularly an end position of the second motion path, to a position in the first path, particularly a start position of the first motion path. The fourth motion path can thus, serve for translating the respective build material application element from the second motion path to the first motion path, particularly from an end position of the second motion path to a start position of the first motion path. The fourth motion path can be deemed or denoted as a translation path for translating a respective build material application element from the second motion path to the first motion path. The fourth motion path can be defined by a fourth translation axis of motion, particularly a fourth linear axis of motion.

The third and fourth motion paths may be horizontally oriented when the first and second motion path are arranged in the same horizontal plane so as to allow for a translation of a build material application element from the first motion path to the second motion path or vice versa. Yet, the third and fourth motion paths are not horizontally, but vertically oriented when the first and second motion path are arranged in different horizontal planes so as to allow for a translation of a build material application element from the first motion path to the second motion path or vice versa.

The drive units adapted to generate a drive force which acts on the build material application elements so as to move the build material application elements in the first and second motion path may also be adapted to move the build material application elements in the third and/or fourth motion paths. Yet, it is also possible that separate drive units adapted to generate a drive force which acts on the build material application elements so as to move the build material application elements in the third and/or fourth motion path are provided. Generally, a respective drive unit may be adapted to generate a drive force which acts on at least one or more build material application element(s) so as to move a respective build material application element in one or more motion paths.

As mentioned above, the build material application device may comprise a control unit adapted to control motions of the first build material application element in the first motion path or second motion path and control motions of the second build material application element in the first motion path or second motion path. The control unit may also be adapted to control motions of the first build material application element in the third and/or fourth motion path control motions of the second build material application element in the third and/or fourth motion path. Generally, a respective control unit may be adapted to control motion of one or more build material application element(s) in one or more motion paths.

Motions of respective build material application elements may be performed simultaneously, i.e. when a first build material application element is in motion, a second build material application element may be in motion, too. The respective build material application elements may thus, be moved simultaneously in the respective motion paths. Hence, a respective control unit may be adapted to at least control motions of the first build material application element so that the first build material application element and the second build material application element are moved simultaneously.

Likewise, motions of respective build material application elements may be performed constantly, i.e. without interruption. The respective build material application elements may thus, be moved constantly in the respective motion paths. Hence, a respective control unit may be adapted to at least control motions of the first build material application element so that the first build material application element and the second build material application element are moved constantly.

The build material application device may further comprise a guiding device adapted to implement a guided motion of the respective build material application elements in the respective motion paths. The guiding device may comprise at least one first guiding element being adapted to implement a guided motion of the first build material application element and/or the second build material application element along the first motion path; and/or at least one second guiding element, the at least one second guiding element being adapted to implement a guided motion of the first build material application element and/or the second build material application element along the second motion path; and/or at least one third guiding element, the at least one third guiding element being adapted to implement a guided motion of the first build material application element and/or the second build material application element along the or a third motion path; and/or at least one fourth guiding element, the at least one fourth guiding element being adapted to implement a guided motion of the first build material application element and/or the second build material application element along the or a fourth motion path. A respective first guiding element may define the first motion path of a respective build material application element, a respective second guiding element may define the second motion path of a respective build material application element, a respective third guiding element may define the or a third motion path of a respective build material application element, a respective fourth guiding element may define the or a fourth motion path of a respective build material application element.

Guiding elements may also be moveably supported. Particularly, respective third and fourth guiding elements may be moveably supported in a direction allowing for translating a respective build material application element from the first motion path to the second motion path or vice versa. As such, respective third and fourth guiding elements may be moveably supported in a horizontal or vertical direction depending on the arrangement of the first and second motion path relative to each other, i.e. if the first and second motion path are arranged in the same horizontal plane (side-by-side arrangement) or in vertically different horizontal planes (stacked arrangement).

Each guiding element may be built as a guiding means, e.g. a guiding rail or the like, or may comprise a respective guiding means. Each build material application element may comprise at least one connecting interface, e.g. a bearing, slider, etc., adapted to provide a, particularly mechanical, connection of a respective build material application element with a respective guiding element or means, respectively.

The invention further relates to an apparatus for additively manufacturing three-dimensional objects, e.g. technical components, by means of successive layerwise selective irradiation and consolidation of layers of build material which can be consolidated by means of an energy beam. A respective build material can be a powdered build material; a powdered build material may comprise at least one of a metal powder, a ceramic powder, or a polymer powder, for instance. A respective energy beam can be a laser beam or an electronic beam, for instance. A respective apparatus can be a selective laser sintering apparatus, a selective laser melting apparatus, or a selective electron beam melting apparatus, for instance.

The apparatus comprises a number of functional devices which are operable during its operation. Each functional device may comprise a number of functional elements. A first exemplary functional device is a build material application device as described herein. Another exemplary functional device is an irradiation device adapted to successively selectively irradiate and consolidate respective layers of build material applied in the build plane with at least one energy beam, e.g. an electron beam or a laser beam, the irradiation device comprising at least one beam generating element adapted to emit the at least one energy beam.

Since the apparatus comprises at least one build material application device as described herein; hence, all annotations concerning the build material application device also apply to the apparatus and vice versa.

The invention further relates to a method for applying an amount, particularly a specific amount, of build material in a build plane of an apparatus for additively manufacturing three-dimensional objects by means of successive layerwise selective irradiation and consolidation of layers of build material which can be consolidated by means of an energy beam. The method comprises the steps of:
  moving a first build material application element at least in a first motion path in which the first build material application element is moved across the build plane, and/or in a second motion path in which the first build material application element is not moved across the build plane, and/or moving a second build material application element at least in a first motion path in which the second build material application element is moved across the build plane, and in a second motion path in which the second build material application element is not moved across the build plane.

The method may be implemented by means of a build material application device as described herein; hence, all annotations concerning the build material application device also apply to the method.

BRIEF DESCRIPTION OF THE DRAWINGS

Exemplary embodiments of the invention are described with reference to the Fig., whereby:

FIG. 1 shows a principle drawing of an apparatus for additively manufacturing three-dimensional objects according to an exemplary embodiment; and FIG. 2-9 each show an enlarged view of a build material application device of the apparatus according to an exemplary embodiment.

DETAILED DESCRIPTION

Figure 4:
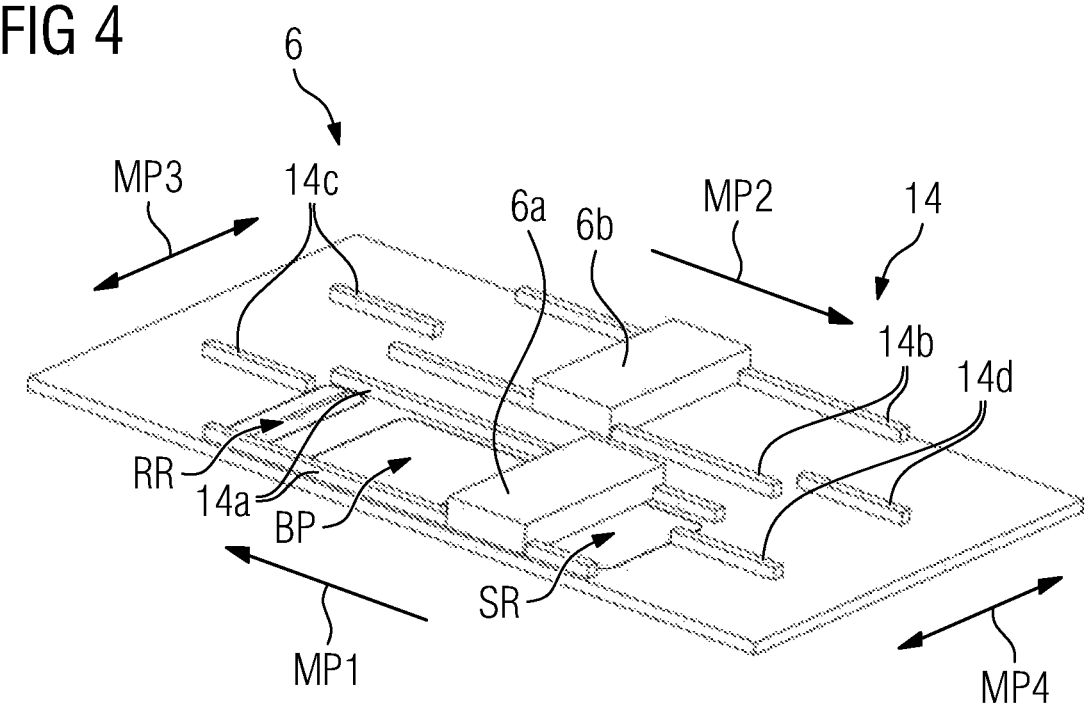

FIG. 1 shows a principle drawing of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of at least one energy beam 4, e.g. a laser beam, according to an exemplary embodiment. The apparatus 1 can be a selective laser melting apparatus, for instance.

The apparatus 1 comprises a number of functional devices which are operable during its operation. Each functional device may comprise a number of functional units. Operation of the functional devices and the apparatus 1, respectively is controlled by a central control device (not depicted).

A first exemplary functional device is a build plate 5, which may form part of a detachable build device 11, particularly a build module, of the apparatus 1, on which the actual additive build-up of the three-dimensional object 2 takes place during operation of the apparatus 1. The build plate 5 may define the spatial extension of a build plane BP in which build material layers, which build material layers are successively selectively irradiated and consolidated during operation of the apparatus 1, are successively applied.

A further exemplary functional device is a build material application device 6, e.g. a re-coating device, adapted to successively apply layers of build material 3 which are to be successively selectively irradiated and consolidated during operation of the apparatus 1 in the build plane BP, the build material application device 6 comprises two moveably supported build material application elements 6a, 6b, e.g. re-coating elements, particularly re-coating blades.

Another functional device is an irradiation device 7 adapted to successively selectively irradiate and consolidate respective layers of build material 3 applied in the build plane BP with the at least one energy beam 4. A further functional device is a dose device 8, particularly a dose module, which is adapted to dose a specific amount of build material 3 which is to be applied in the build plane BP of the apparatus 1 during motion of a build material application element 6a, 6b in a first motion path MP1 which will be explained below in more detail. The dose device 8 is provided in a powder supplying region SR of the apparatus 1 or a process chamber 10 of the apparatus 1, respectively. The dose device 8 may be detachably coupled to the process chamber 10.

Another functional device is an overflow device 9, particularly an overflow module, which is adapted to receive a specific amount of build material 3 which was not applied in the build plane BP of the apparatus 1 during motion of a build material application element 6a, 6b in the first motion path MP1 which will be explained below in more detail. The overflow device 9 is provided in a build material receiving region RR of the apparatus 1 or the process chamber 10 of the apparatus 1, respectively. The overflow device 9 may be detachably coupled to the process chamber 10.

As mentioned above, the build material application device 6 is adapted to apply a specific amount of build material 3 in the build plane BP of the apparatus 1 so as to form a build material layer which is to be selectively irradiated and consolidated during operation of the apparatus 1. This build material application process is repeated several times during operation of the apparatus 1.

As is apparent from the exemplary embodiments according to FIG. 2-17, the build material application device 6 may comprise two separate build material application elements 6a, 6b, i.e. re-coating elements, e.g. a re-coating blades. Yet, other embodiments of the build material application device 6 and respective build material application elements 6a, 6b are conceivable; as such, a build material application element 6a, 6b may be built as a build material containment (not shown) having at least one, particularly gate-like, opening through which build material 3 may exit the containment so as to apply a specific amount of build material 3 in the build plane BP of the respective apparatus 1; the at least one opening being controllably closable by at least one closing element.

As is apparent from FIG. 2-9 showing a first exemplary embodiment of the build material application device 6, the first build material application element 6a is moveably supported in a first translational motion path MP1 (indicated by arrow) in which the first build material application element 6a is moved across the build material supplying region SR, the build plane BP and the build material receiving region RR of the apparatus 1 (see particularly FIG. 2-7). Likewise, the first build material application element 6a is moveably supported in a second translational motion path MP2 (indicated by arrow) in which the first build material application element 6a is not moved across the build material supplying region SR, the build plane BP and the build material reviving region RR of the apparatus 1 (see FIG. 9). As is particularly apparent from FIG. 2, 7-9, the first build material application element 6a is further moveably supported in a third translational motion path MP3 (indicated by arrow) in which the first build material application element 6a is moved in a transverse direction relative to the first and second motion path MP1, MP2 and in a fourth translational motion path MP4 (indicated by arrow) in which the first build material application element 6a is moved in a transverse direction relative to the first and second motion path MP1, MP2. As is clear from FIG. 2-9, first and second motions paths MP1, MP2 are parallel, yet oppositely directed; likewise, third and fourth motions paths MP3, MP4 are parallel, yet oppositely directed. The third motion path MP3 can be deemed as a translation path for translating a respective build material application element 6a, 6b from the first motion path MP1 to the second motion path MP2. The fourth motion path MP4 can be deemed as a translation path for translating a respective build material application element 6a, 6b from the second motion path MP2 to the first motion path MP1.

Figure 9:
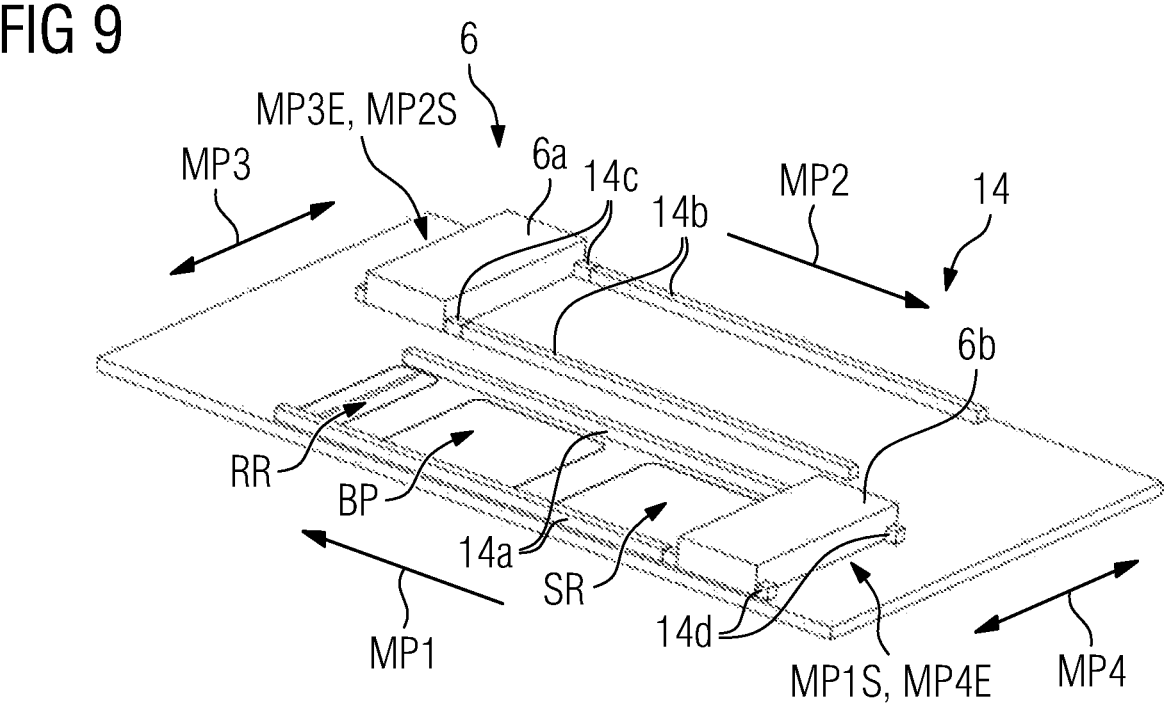
Figure 10:
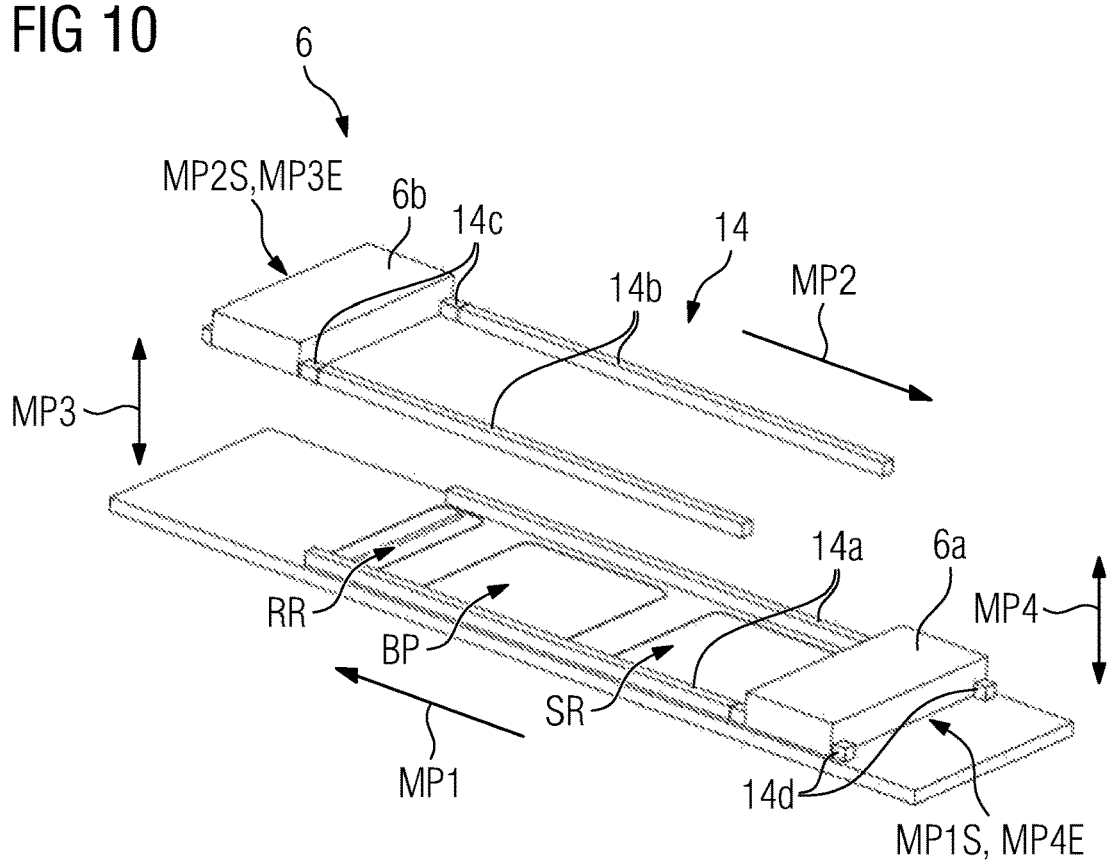
FIG. 10-17 each show an enlarged view of a build material application device of the apparatus according to an exemplary embodiment.

As is also apparent from FIG. 2-9, the second build material application element 6b is moveably supported in the first motion path MP1 in which the second build material application element 6b is moved across the build material supplying region SR, the build plane BP and the build material reviving region RR of the apparatus 1 (see particularly FIG. 9). Likewise, the second build material application element 6b is moveably supported in the second motion path MP2 (indicated by arrow) in which the second build material application element 6b is not moved across the build material supplying region SR, the build plane BP and the build material reviving region RR of the apparatus 1 (see FIG. 2-8). As is particularly apparent from FIG. 2, 7-9, the second build material application element 6b is further moveably supported in the third motion path MP3 in which the second build material application element 6b is moved in a transverse direction relative to the first and second motion path MP1, MP2 and in the fourth motion path MP4 in which the second build material application element 6b is moved in a transverse direction relative to the first and second motion path MP1, MP2.

As is clear from FIG. 2-9, the motion paths MP1-MP4 of the first build material application element 6a may be the same as the motion paths MP1-MP4 of the second build material application element 6b.

The respective motion paths MP1-MP4 the build material application elements 6a, 6b are movably supported in, i.e. along which the build material application elements 6a, 6b can be moved, are defined by a motion path-related start position MP1S, MP2S, MP3S, MP4S and a motion path-related end position MP1E, MP2E, MP3E, MP4E (see FIG. 2-9). As such, a respective first motion path MP1 extends between start position MP1S and end position MP1E, a respective second motion path MP2 extends between start position MP2S and end position MP2E, a respective third motion path MP3 extends between start position MP3S and end position MP3E, and a respective fourth motion path MP4 extends between start position MP4S and end position MP4E. As is apparent from FIG. 2-9, some start and end positions coincide, e.g. an end position MP1E, MP2E of a first or second motion path MP1, MP2 coincides with a start position MP1S, MP2S of a second or first motion path MP1, MP2.

The start position MP1S of a respective first motion path MP1 is laterally offset from a first side (right side) of the build plane BP. In other words, the start position MP1S of a respective first motion path MP1 is laterally adjacently located to a first (lateral) side of the build plane BP. The start position MP1S of a respective first motion path MP1 is in the build material supplying region SR. The same applies to the end position MP4E of a respective fourth motion path MP4. The end position MP1E of a respective first motion path MP1 is laterally offset from a first side (left side) of the build plane BP. In other words, the end position MP1E of a respective first motion path MP1 is laterally adjacently located to a second (lateral) side of the build plane BP. The end position MP1E of a respective first motion path MP1 is in the build material receiving region RR. The same applies to the start position MP3S of a respective third motion path MP3. Thus, the start and end position MP1S, MP1E of a respective first motion path MP1 are arranged in a plane which does comprise the build plane BP. Hence, the first motion path MP1 may be expressed by a line extending across the build plane BP.

The start position MP2S of a respective second motion path MP2 is also laterally offset from a first side (left side) of the build plane BP. The end position MP2E of a respective second motion path MP2 is (laterally) offset from a second side (right side) of the build plane BP. Yet, the second motion path MP2 does not comprise the build plane BP. Thus, the start and end position MP2S, MP2E of a respective second motion path MP2 are arranged in a plane which does not comprise the build plane BP. Hence, the second motion path MP2 may be expressed by a line not extending across the build plane BP.

Hence, the first motion path MP1 and the second motion path MP2 extend in the same horizontal plane. Yet, the first motion path MP1 and the second motion path MP1 are horizontally offset from each other while being arranged in the same horizontal plane. In other words, the first motion path MP1 and the second motion path MP2 extend in parallel given that the first motion path MP1 extends across the build plane BP and the second motion path MP2 does not extend across the build plane BP.

As is clear from FIG. 2-9, when moving the first or second build material application element 6a, 6b in the first motion path MP1, the first or second build material application element 6a, 6b is moved across the build plane BP so that it is possible to apply a specific amount of build material 3 in the build plane BP and thus, possible to form a build material layer which is to be selectively irradiated and consolidated during operation of the apparatus 1. The first motion path MP1 may therefore, be deemed or denoted as a build material application path in which build material 3 is applied in the build plane BP so as to form a respective build material layer.

As is also clear from FIG. 2-9, when moving the first or second build material application element 6a, 6b in the second motion path MP2, the first or second build material application element 6a, 6b is not moved across the build plane BP so that it is not possible to apply a specific amount of build material 3 in the build plane BP and not possible to form a build material layer which is to be selectively irradiated and consolidated during operation of the apparatus 1. The second motion path MP2 may therefore, be deemed or denoted as a return path in which no build material 3 is applied in the build plane BP so as to not form a respective build material layer.

The build material application elements 6a, 6b are moveable in the respective motion paths MP1-MP4 by means of at least one drive unit (not shown), e.g. a linear drive unit, in particular a linear motor, adapted to generate a drive force which acts on the build material application elements 6a, 6b so as to move the build material application elements 6a, 6b in the respective motion paths MP1-MP4.

The build material application device 6 may comprise a hard- and/or software embodied control unit 12 which is adapted to control motions of the build material application elements 6a, 6b in the respective motion paths MP1-MP4. The control unit 12 may communicate with respective drive units adapted to generate respective drive forces which act on the build material application elements 6a, 6b so as to move the build material application elements 6a, 6b in the respective motion paths MP1-MP4. The control unit 12 is adapted to control motions of the first and second build material application elements 6a, 6b so that the first build material application element 6a and the second build material application 6b element are moved constantly and/or simultaneously. Motions of respective build material application elements 6a, 6b may thus, be performed constantly and/or simultaneously.

FIG. 2-9 also show a guiding device 14 adapted to implement a guided motion of the respective build material application elements 6a, 6b in the respective motion paths MP1-MP4. The guiding device 14 comprises first guiding elements 14a defining the first motion path MP1, i.e. a pair of first guiding elements 14a, being adapted to implement a guided motion of the first or second build material application element 6a, 6b along the first motion path MP1; second guiding elements 14b defining the second motion path MP2, i.e. a pair of second guiding elements 14b, being adapted to implement a guided motion of the first or second build material application element 6a, 6b along the second motion path MP2; third guiding elements 14c defining the third motion path MP3, i.e. a pair of third guiding elements 14c, being adapted to implement a guided motion of the first or second build material application element 6a, 6b along the third motion path MP3, and fourth guiding elements 14d defining the fourth motion path MP4, i.e. a pair of fourth guiding elements 14d, being adapted to implement a guided motion of the first or second build material application element 6a, 6b along the fourth motion path MP4. Each guiding element 14a-14d may be built as a guiding means, e.g. a guiding rail or the like, and may comprise a connecting interface adapted to provide a, particularly mechanical, connection of a respective build material application element 6a, 6b with a respective guiding element 14a-14d or means, respectively. As is clear from e.g. FIG. 3-5, the third and fourth guiding elements 14c, 14d may be moved along the third or fourth motion path MP3, MP4 so as to translate a build material application element 6a, 6b from the first motion path MP1 to the second motion path MP2 or vice versa.

Figure 5:
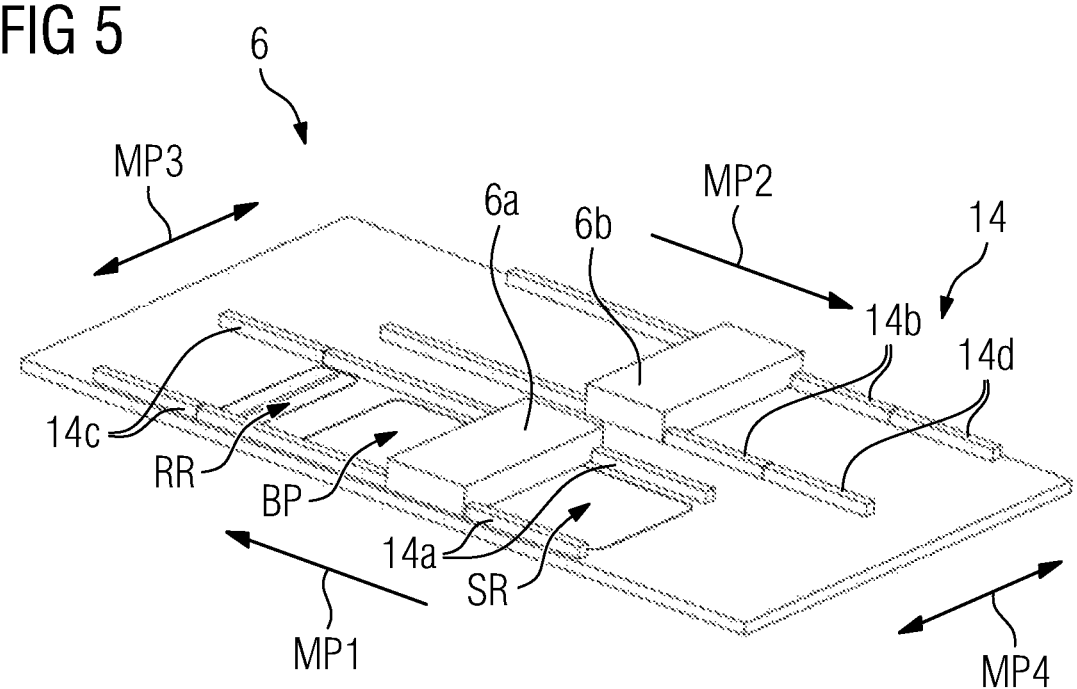
Figure 6:
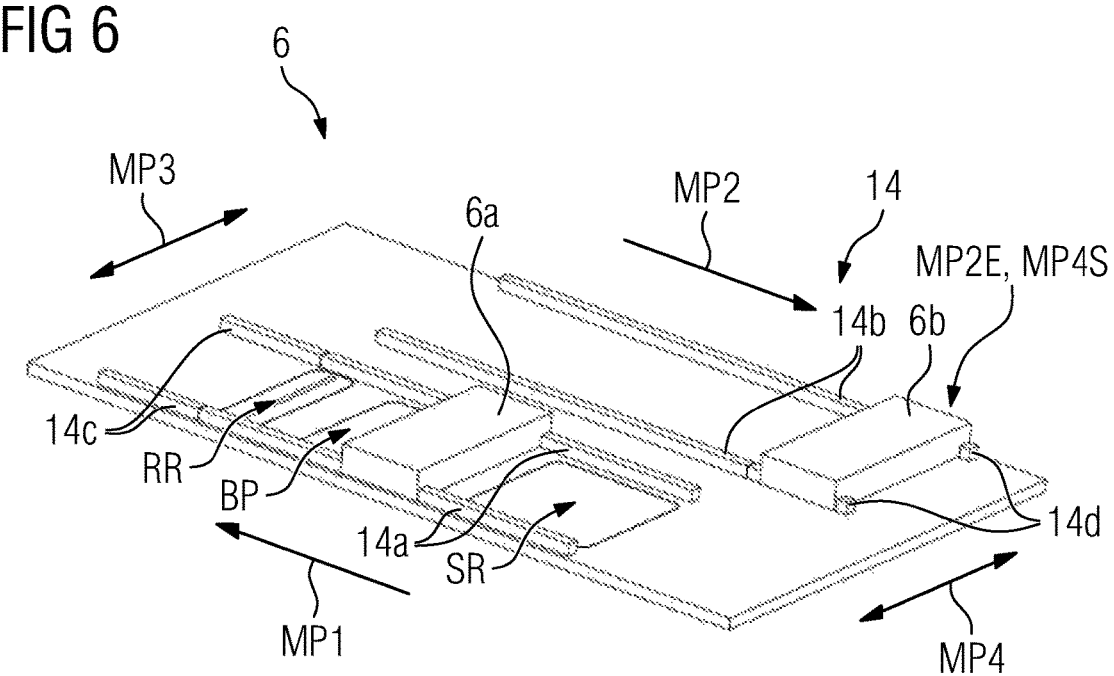
Figure 7:
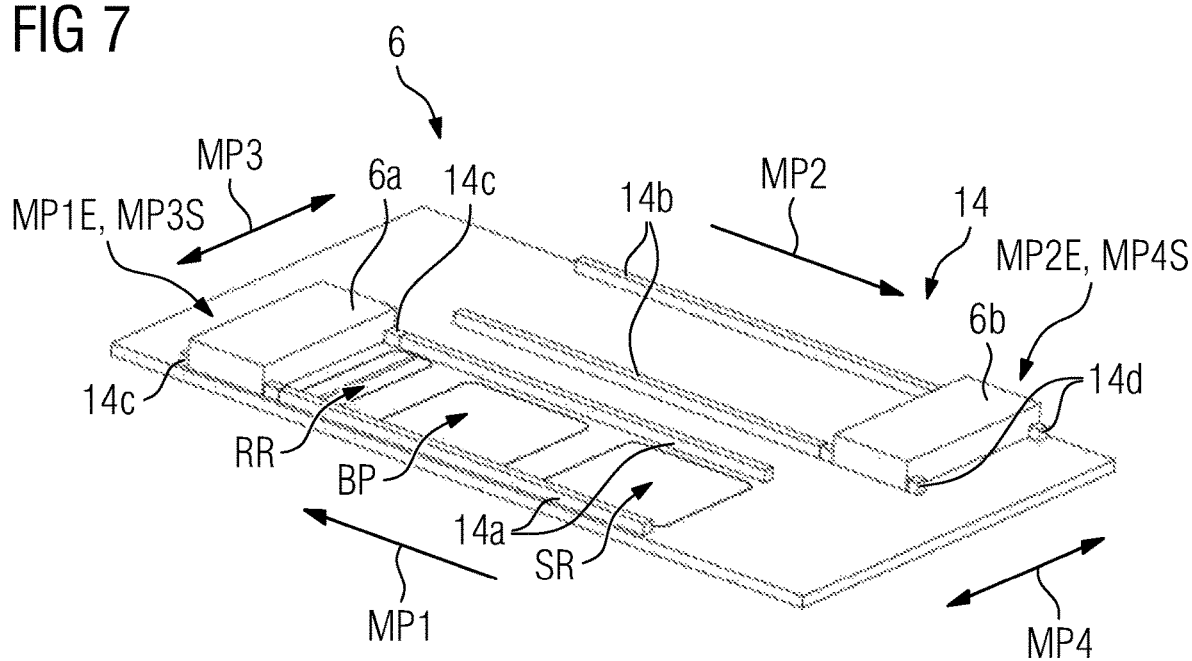
Figure 8:
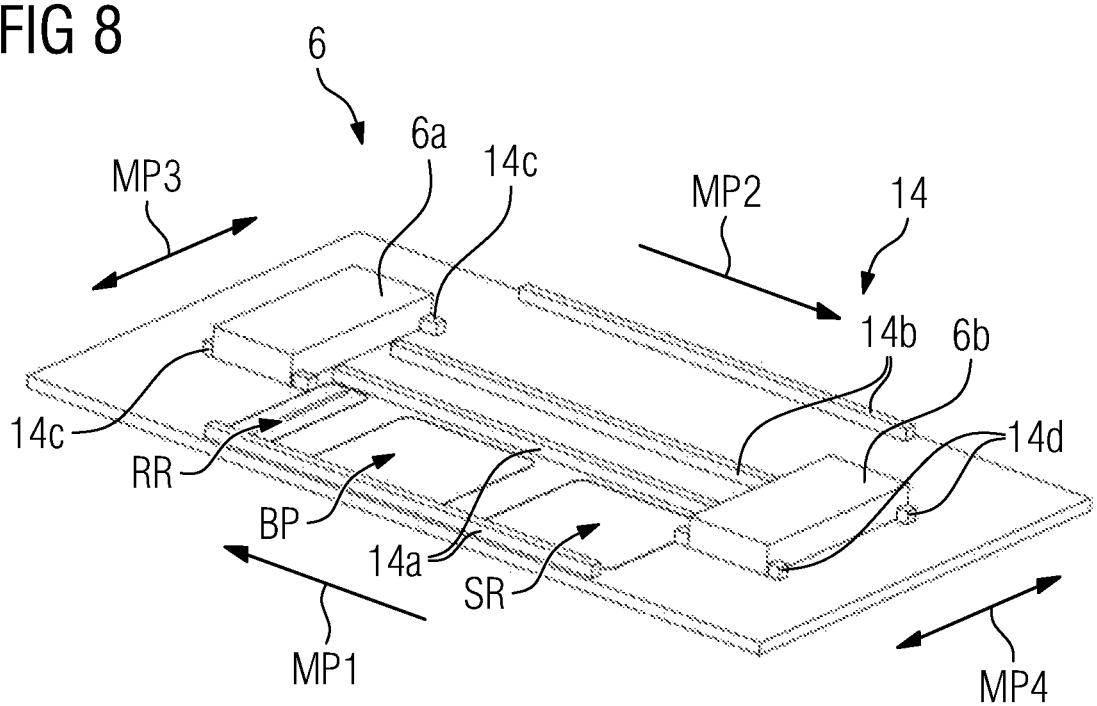

The double-arrow of reference signs MP3, MP4 indicates that the third and fourth guiding elements 14c, 14d can be moved in two different directions, i.e. from the respective start position MP3S, MP4S to the respective end position MP3E, MP4E and vice versa. The motion of the third guiding elements 14c from the end position MP3E to the start position MP3S is shown in FIG. 3-5, the motion of the fourth guiding elements 14d from the end position MP4E to the start position MP4S is also shown in FIG. 3-5. As is clear from particularly FIG. 3-5, the motion of the third and fourth guiding elements 14c, 14d along motion paths MP3, MP4 can be simultaneous to the motion the build material application elements 6a, 6b along motion paths MP1, MP2.

FIG. 10-17 each show an enlarged view of a build material application device 6 of the apparatus 1 according to another exemplary embodiment. Compared with the exemplary embodiment of FIG. 2-9, the first motion path MP1 and the second motion path MP2 do not extend in the same horizontal plane, but extend in different horizontal planes. In other words, the first motion path MP1 and the second motion path MP2 are vertically offset from each other since they are arranged in different horizontal planes, the planes being vertically offset from each other. According to the exemplary embodiment of FIG. 10-17, the first motion path MP1 and the second motion path MP2 thus, extend on top of each other resulting in vertically stacked arrangement of the first and second motion path MP1, MP2. The principle of motion of the build material application elements 6a, 6b is analogous to the exemplary embodiment of FIG. 2-9.

Figure 11:
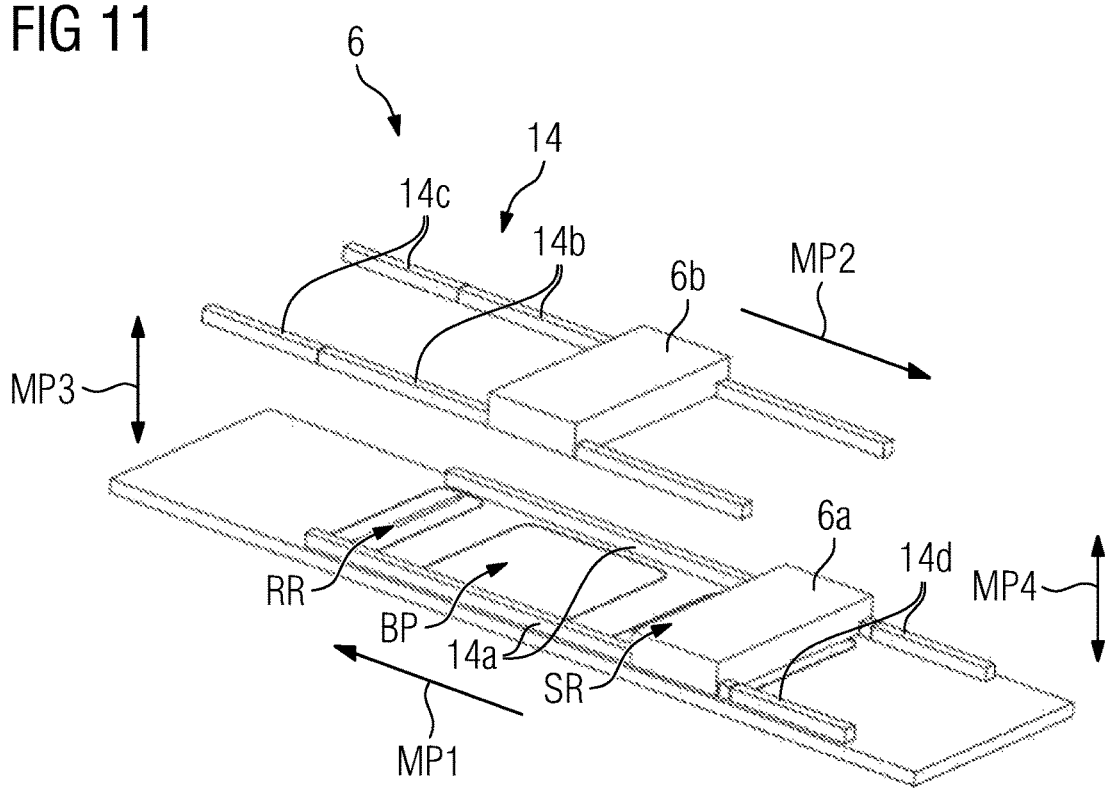
Figure 12:
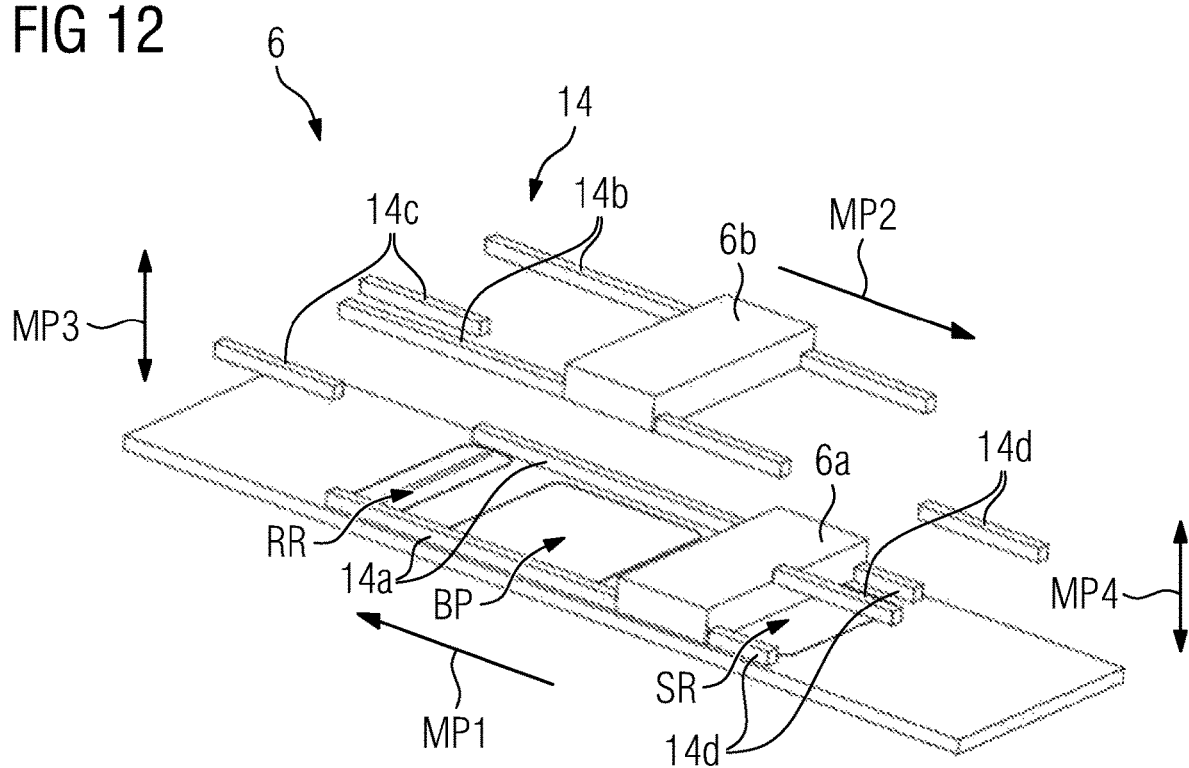
Figure 13:
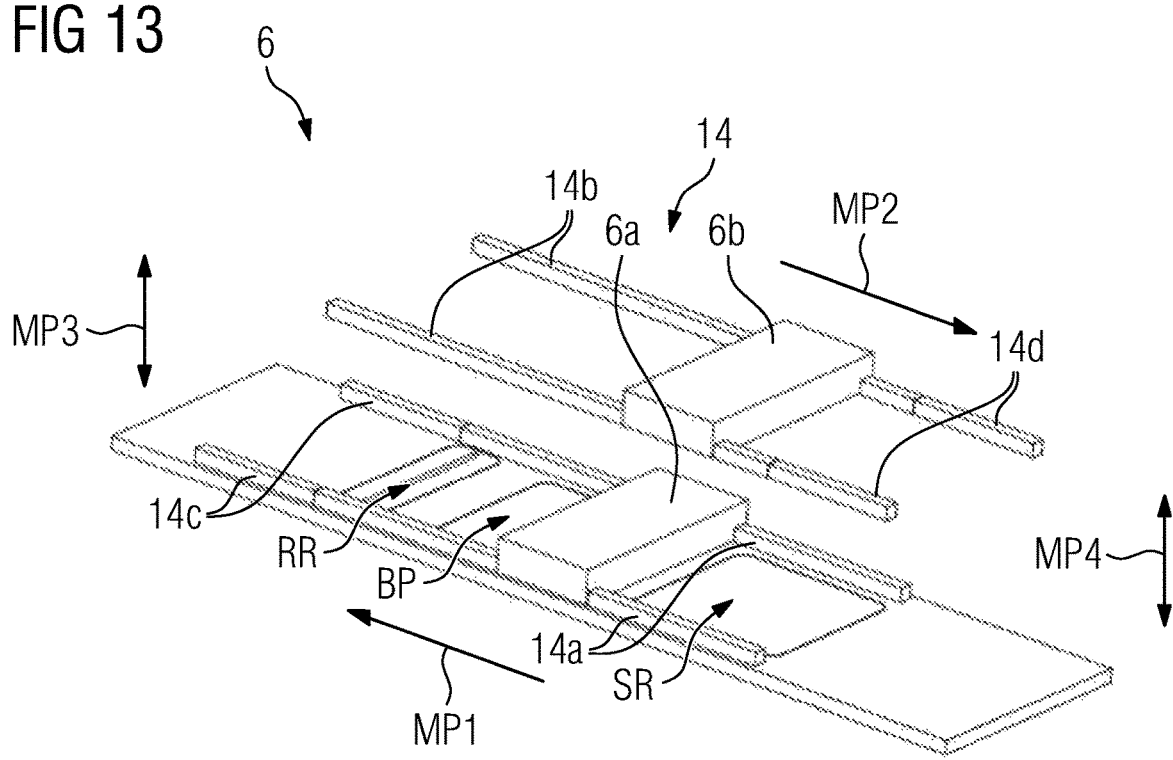
Figure 14:
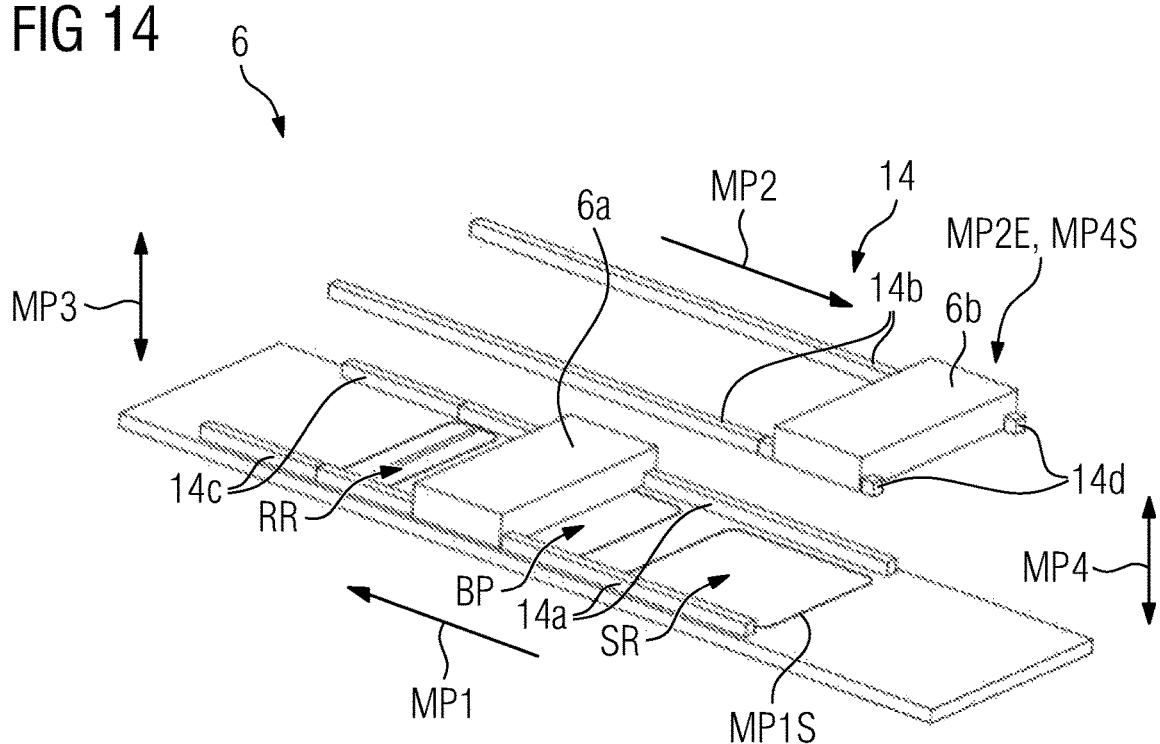
Figure 15:
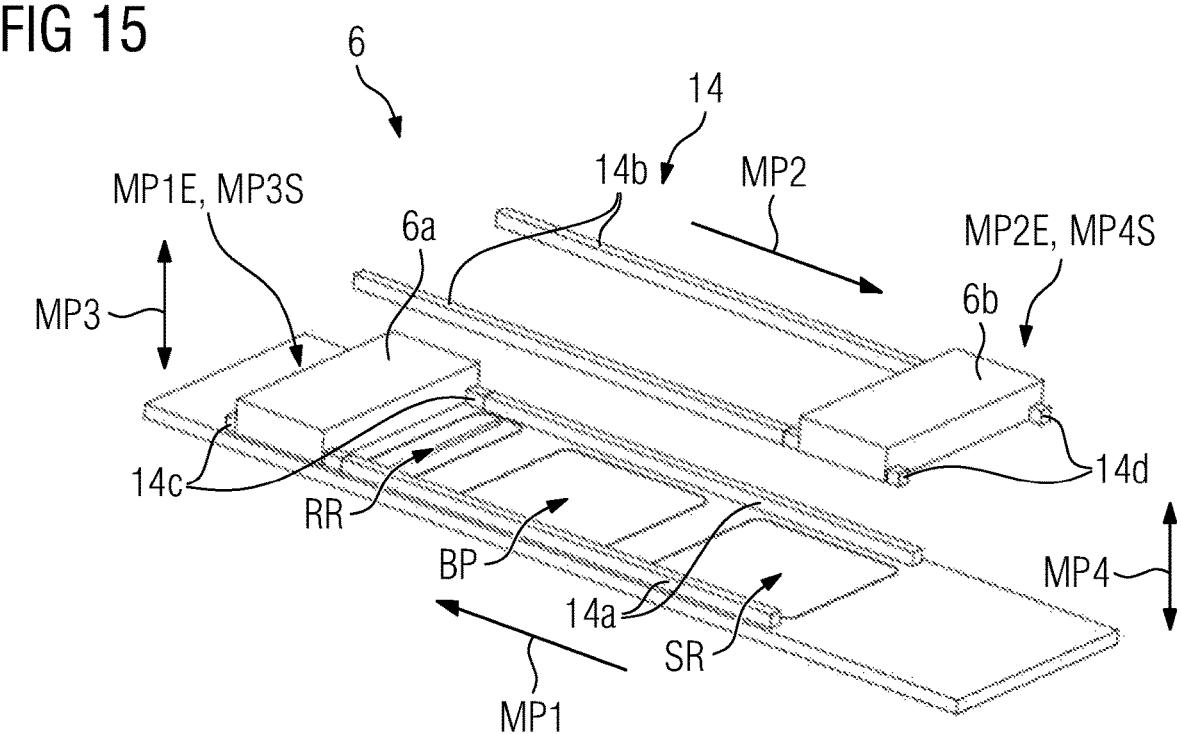
Figure 16:
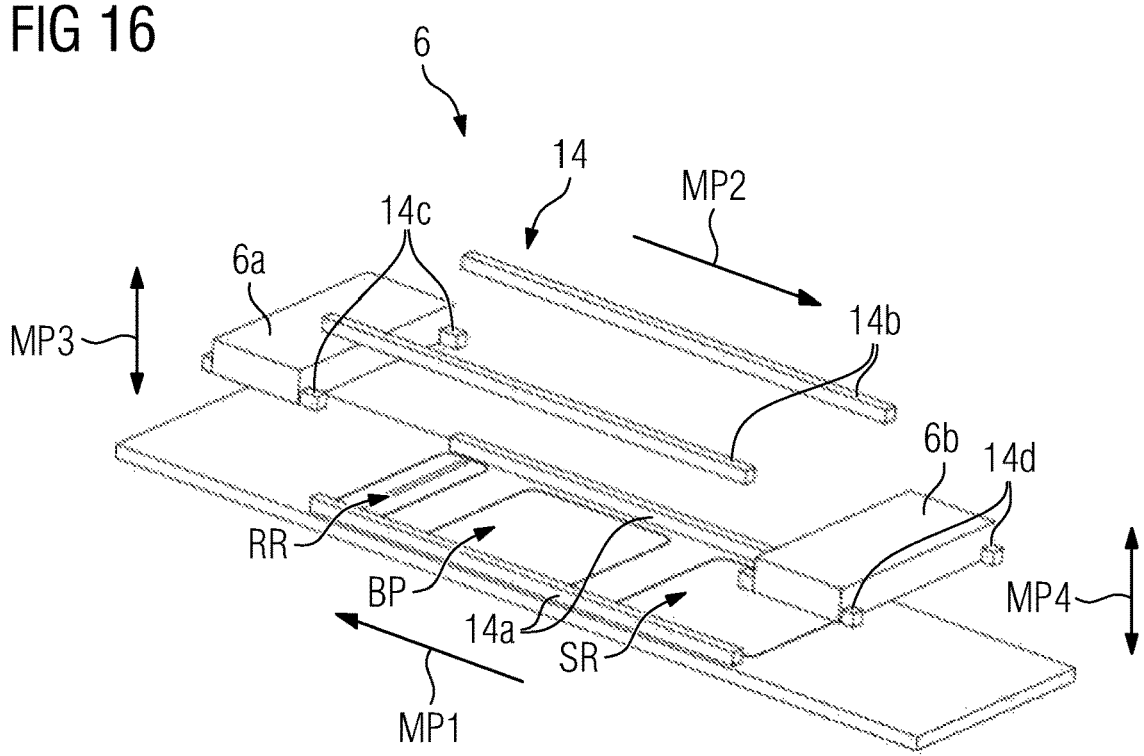
Figure 17:
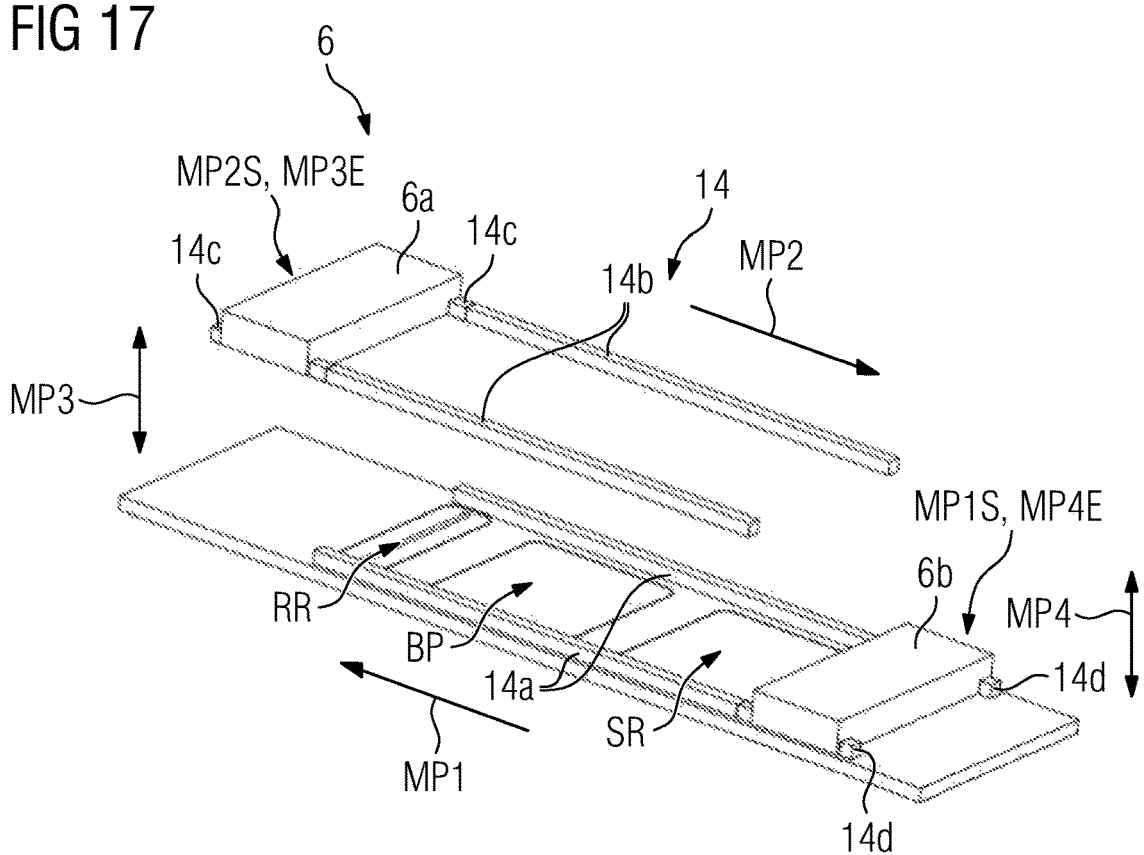

As is apparent from FIG. 11-13, the third and fourth motion paths MP3, MP4 are not horizontally, but vertically oriented so as to allow for a translation of a build material application element 6a, 6b from the first motion path MP1 to the second motion path MP2 or vice versa.

The apparatus 1 and build material application device 6, respectively allows for implementing a method for applying a specific amount of build material 3 in a build plane BP of an apparatus 1 for additively manufacturing three-dimensional objects 2 by means of successive layerwise selective irradiation and consolidation of layers of build material 3 which can be consolidated by means of an energy beam 4. The method comprises the steps of:

moving a first build material application element 6a at least in a first motion path MP1 in which the first build material application element 6a is moved across the build plane BP so that formation of a build material layer is possible, and/or in a second motion path MP2 in which the first build material application element 6a is not moved across the build plane BP so that formation of a build material layer is not possible, and moving a second build material application element 6b at least in a first motion path MP1 in which the second build material application element 6b is moved across the build plane BP so that formation of a build material layer is possible, and in a second motion path MP2 in which the second build material application element 6b is not moved across the build plane BP so that formation of a build material layer is not possible.

The invention claimed is:

1. A build material application device for an apparatus for additively manufacturing three-dimensional objects by successive layerwise selective irradiation and consolidation of layers of build material with an energy beam, the build material application device being adapted to apply an amount of build material in a build plane of a respective apparatus, the build material application device comprising:
a first build material application element, the first build material application element being moveably supported in a first motion path in which the first build material application element is moved across a build plane of a respective apparatus, and in a second motion path in which the first build material application element is moved past the build plane in a direction opposite the first motion path while being laterally offset from a side of the build plane, wherein build material cannot be applied to the build plane with the first build material application element being laterally offset from the side of the build plane; and
a second build material application element, the second build material application element being moveably supported in a first motion path in which the second build material application element is moved across the build plane, and in a second motion path in which the second build material application element is moved past the build plane in a direction opposite the first motion path while being laterally offset from the side of the build plane, wherein build material cannot be applied to the build plane with the second material application element being laterally offset from the side of the build plane;
wherein the first motion path of the first build material application element and the first motion path of the second build material application element extend in the same horizontal plane, and wherein the second motion path of the first build material application element and the second motion path of the second motion path of the second build material application element extend in the same horizontal plane.

2. The build material application device according to claim 1, wherein the first motion path extends between a start position and an end position and the second motion path extends between a start position and an end position.

3. The build material application device according to claim 2, wherein the start position of the first motion path is laterally offset from a first side of the build plane in a build material supplying region in which an amount of build material which is to be applied in the build plane of a respective apparatus during motion of the first or second build material application element in the first motion path is supplyable or supplied, and
the end position of the first motion path is laterally offset from a second side of the build plane in a build material receiving region in which an amount of build material which was not applied in the build plane of a respective apparatus during motion of the first or second build material application element in the first motion path is receivable or received.

4. The build material application device according to claim 1, wherein the first motion path of the first build material application element is the same as the first motion path of the second build material application element, and
the second motion path of the first build material application element is the same as the second motion path of the second build material application element.

5. The build material application device according to claim 1, wherein the first motion path of the first build material application element and the second motion path of the first build material application element extend in the same horizontal plane, and wherein the first motion path of the second build material application element and the second motion path of the second build material application element extend in the same horizontal plane.

6. The build material application device according to claim 5, wherein the first motion path of the first build material application element and the second motion path of the first build material application element extend in parallel and wherein the first motion path of the second build material application element and the second motion path of the second build material application element at least partially extend in parallel.

7. The build material application device according to claim 1, wherein the first motion path of the first build material application element and the second motion path of the first build material application element extend in different horizontal planes and wherein the first motion path of the second build material application element and the second motion path of the second build material application element extend in different horizontal planes.

8. The build material application device according to claim 1, wherein the first build material application element is moveably supported in a third motion path in which the first or second build material application element is moved from an end position of the first motion path, to a start position of the second motion path.

9. The build material application device according to claim 1, wherein the first build material application element is moveably supported in a fourth motion path in which the first build material application element is moved from an end position of the second motion path, to a start position of the first motion path; and
wherein the second build material application element is moveably supported in a third motion path in which the second build material application element is moved from an end position of the first motion path to a start position of the second motion path.

10. The build material application device according to claim 1, further comprising a control unit adapted to at least:
control motions of the first build material application element in the first motion path and in the second motion path; and
control motions of the second build material application element in the first motion path and in the second motion path.

11. The build material application device according to claim 10, wherein the control unit is adapted to at least control motions of the first and second build material application elements so that the first and second build material application elements are moved simultaneously.

12. The build material application device according to claim 10, wherein the control unit is adapted to at least control motions of the first and second build material application elements so that the first and second build material application elements are moved constantly.

13. The build material application device according to claim 1, wherein at least one of:
the first motion path;
the second motion path;
a third motion path; or
a fourth motion path is a translational motion path.

14. The build material application device according to claim 1, further comprising a guiding device adapted to implement a guided motion of the first and second build material application elements, the guiding device comprising:
at least one first guiding element being adapted to implement a guided motion of the first build material application element and/or the second build material application element along the first motion path; and
at least one second guiding element, the at least one second guiding element being adapted to implement a guided motion of the first build material application element and the second build material application element along the second motion path;
at least one third guiding element, the at least one third guiding element being adapted to implement a guided motion of the first build material application element and/or the second build material application element along a third motion path; and
at least one fourth guiding element, the at least one fourth guiding element being adapted to implement a guided motion of the first build material application element and the second build material application element along a fourth motion path.

15. A method for applying an amount of build material in a build plane of an apparatus for additively manufacturing three-dimensional objects by means of successive layerwise selective irradiation and consolidation of layers of build material which can be consolidated by means of an energy beam, the method comprising the steps of:
moving a first build material application element in a first motion path in which the first build material application element is moved across the build plane, and/or in a second motion path in which the first build material application element is moved past the build plane of the apparatus in a direction opposite the first motion path while being laterally offset from a side of the build plane, wherein build material cannot be applied to the build plane with the first build material application element being laterally offset from the side of the build plane, and
moving a second build material application element in a first motion path in which second build material application element is moved across the build plane of the apparatus, and in a second motion path in which the second build material application element is moved past the build plane in a direction opposite the first motion path while being laterally offset from the side of the build plane, wherein build material cannot be applied to the build plane with the second material application element being laterally offset from the side of the build plane;

wherein the first motion path of the first build material application element and the first motion path of the second build material application element extend in the same horizontal plane, and wherein the second motion path of the first build material application element and the second motion path of the second motion path of the second build material application element extend in the same horizontal plane.

\* \* \* \* \*